United States Patent [19]

Li

[11] Patent Number: 5,487,303

[45] Date of Patent: Jan. 30, 1996

[54] SPEEDOMETER CAPABLE OF PROVIDING REAL-TIME SPEED PULSE SIGNALS

[76] Inventor: Yang R. Li, Room 302, No. 9, Building B, Shantou University, Shantou City, Guangdong, China

[21] Appl. No.: 87,652

[22] Filed: Jul. 6, 1993

[30] Foreign Application Priority Data

Jul. 8, 1992 [CN] China .................. 92105176.X

[51] Int. Cl.⁶ ........................................ G01P 3/10
[52] U.S. Cl. ........................ 73/499; 340/441; 340/936
[58] Field of Search ........................ 73/518, 519, 499, 73/517 R, 519 R, 492, 493, 866.1; 324/99 R, 157, 161, 166, 169, 175, 96, 97, 115; 340/441, 466; 364/424.04; 116/62.1

[56] References Cited

U.S. PATENT DOCUMENTS

| | | | |
|---|---|---|---|
| 2,771,597 | 11/1956 | Freedman | 340/688 |
| 3,237,012 | 2/1966 | Treffeisen | 250/557 |
| 3,331,200 | 7/1967 | Byron et al. | 368/5 |
| 3,909,780 | 9/1930 | Huffman | 340/463 |

FOREIGN PATENT DOCUMENTS

58-141945  8/1983  Japan ....................... 340/441

Primary Examiner—Hezron E. Williams
Assistant Examiner—Christine K. Oda
Attorney, Agent, or Firm—Willian Brinks Hofer Gilson & Lione

[57] ABSTRACT

A speedometer capable of providing real-time speed signals, that can be combined with different functional devices and speed control units, to facilitate the automatic recording and controlling of the speed, thereby forming a multifunctional automatic monitoring and controlling device for vehicles. Photoelectric sensors are disposed in the conventional mechanical magnet-type speedometer, and a LED is mounted on the speed indicating needle shaft. The ON and OFF states of the LED can be controlled by a signal from within or from external of the vehicle. The output of the photosensors are connected to a multichannel photoelectric converter.

14 Claims, 7 Drawing Sheets

SPEEDOMETER CAPABLE OF PROVIDING REAL-TIME SPEED PULSE SIGNALS

TECHNICAL FIELD

The present invention relates to a speedometer, and in particular it relates to a speedometer for vehicles which can provide real-time speed signal by means of photoelectric technology. The present speedometer can both measure the speed of vehicles or automatically record and control the speed of vehicles by using the real-time speed signals. Thus, this invention provides a multifunctional device for monitoring and controlling the speed of vehicles.

BACKGROUND OF THE INVENTION

Most known speedometers for vehicles, commonly known as "eddy-current drag cup speedometers", are mechanical magnet-type speedometers wherein eddy currents can be induced by the movement of a permanent magnet within an iron cup. In these known speedometers when the vehicle is moving, the permanent magnet is driven by the engine through a flexible shaft. The speed is indicated by the deflecting angle of a needle which is driven by the torque produced by interaction between the eddy current and the magnet. A few electric speedometers have been used in cars, however, they cannot provide real-time speed signals which can be used to record and control speed. In addition, current speedometers provide only the speed measurement function rather than multifunctions. In other words, current electric speedometers do not include means for connecting to other control options in order to form a speedometer with various control functions. Particularly, the unchanged mechanical magnet-type speedometer is not compatible with the rapid development in the vehicle industry because of its single function, and cannot keep pace with the trend of electrifying and automating in the vehicle industry.

SUMMARY OF THE INVENTION

The present invention provides a new speedometer based on conventional technology and normal functions of the prior art.

The object of the present invention is to provide a speedometer which can provide real-time speed signals by using photoelectric sensing technology and processing circuits.

A second object of the present invention is to provide a speedometer having a speed recorder and indicator for forming an automatic speed recording type speedometer.

Another object of the present invention is to provide a speedometer with stand-by output interfaces, therefore a multifunctional speedometer for monitoring and controlling the speed of vehicles. Such a device can be formed by connecting the stand-by output interfaces of the invention to different functional means and different speed control units.

According to the present invention, a speedometer capable of providing real-time speed signals, comprises a magnet-type speed transmitting portion, a speed indicating portion, a photoelectric monitoring portion and a speed signal conversion portion.

The speed transmitting portion of the invention could have a driving flexible shaft connected to a driving shaft, the driving shaft is fitted with a permanent magnet magnetically-coupled with an iron cup, and the iron cup being fitted with a speed indicating needle shaft.

The speed indicating portion of this invention could have a speed indicating needle fitted on the speed indicating needle shaft, and a speed indicating dial being positioned under the speed indicating needle.

The photoelectric monitoring portion of this invention comprises:

A LED is disposed on the speed indicating needle shaft. The light emitted from the LED travels through the indicating needle and is transmitted out from the tip of the speed indicating needle.

A plurality of photosensitive elements are positioned at the periphery of the indicating dial. The photosensitive elements receive the light from the indicating needle and produce electric signals.

The speed signal conversion portion of this invention comprises: a multichannel photoelectric converter which is connected to the output of the photosensitive elements;

A coder with an interface thereon and a photoelectric amplifier with an interface thereon, which are connected to the output of the multichannel photoelectric converter to form interfaces for providing real-time signals.

This invention also includes a control switch unit which is connected to the LED for controlling the ON-OFF states of the LED according to internal vehicle operation signals and/or external control signals.

The present invention has the following advantages:
1. The new speedometer can be produced by adding a photoelectric sensing device to a conventional speedometer combined with a signal processing circuit, without destroying or changing the original structure. As a result it has a simple structure and is easy to use and install.
2. It can provide real-time speed signals, and can be connected to different functional means and speed control units to facilitate various speed recording functions and speed control modes.

The principle and embodiments of the present invention will be described in detail in accordance with the accompanying drawings.

DESCRIPTION OF THE PREFERRED EMBODIMENT

Figure 1A:
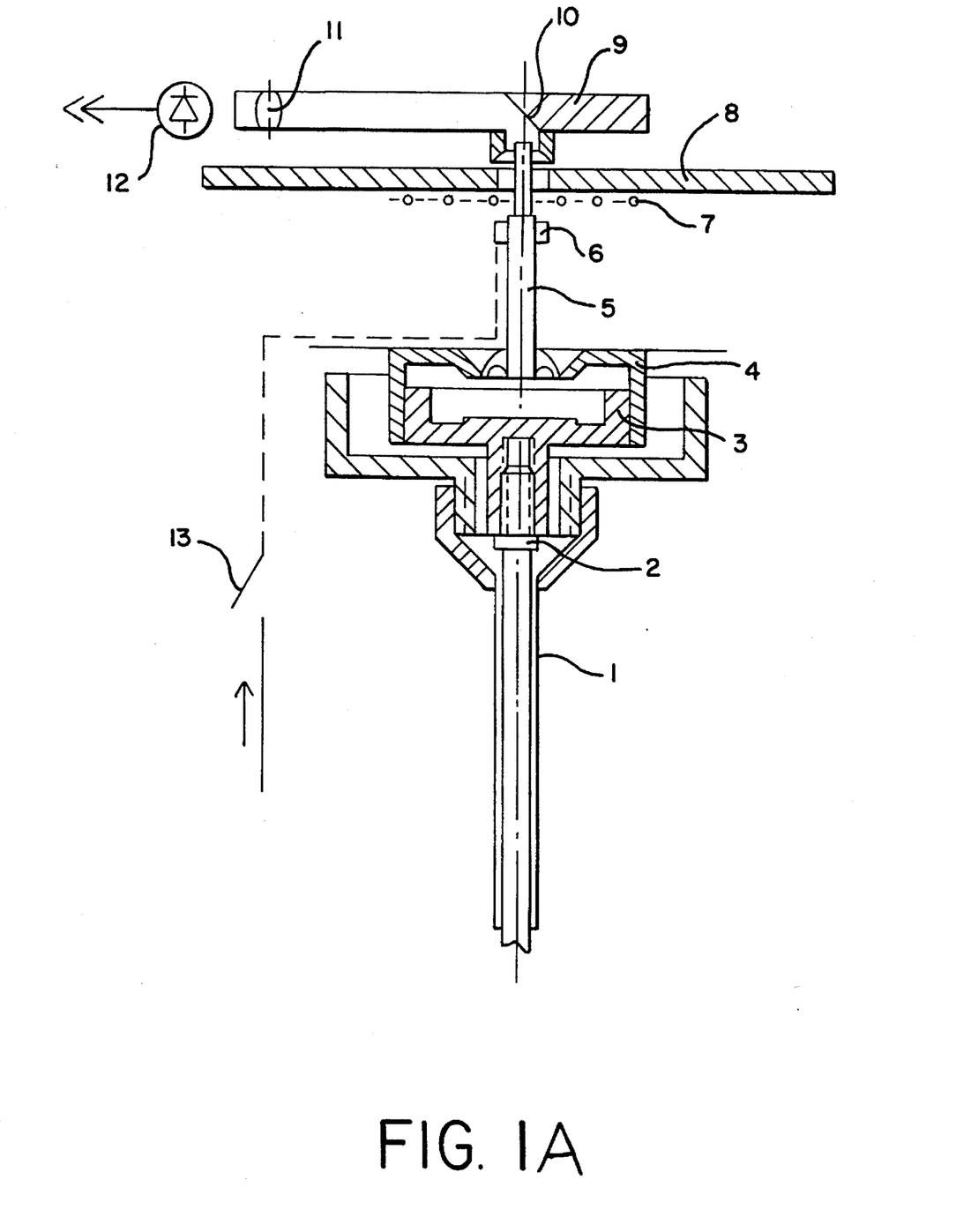
FIG. 1A is a schematic diagram showing an embodiment of the structure of the speedometer according to the present invention.

The speedometer of the present invention, as shown in FIG. 1A comprises a conventional mechanical magnet-type speedometer and a photoelectric sensing unit, including a flexible cable 1, a driving shaft 2, permanent magnet 3, iron cup 4 and hairspring 7, all of which components are included in known speedometers. The present invention also includes a photoelectric speed indicating needle shaft 5 which is formed by adding a LED 6 on the conventional speed indicating needle shaft; a photoelectric speed dial 8 which is formed by adding a plurality of photoelectric sensors 12 on the conventional dial; a photoelectric speed indicating needle 9 which is formed by adding a mirror 10 and a converging lens 11 to a conventional indicating needle. Light emitted from the LED 6 is projected onto the mirror 10 which is disposed within the photoelectric indicating needle 9 at an angle of 45 degrees to the photoelectric speed indicating dial 8. The mirror 10 directs the light to the lens 11 which is disposed at the tip of the needle 9. The light then is projected through the lens 11 to photoelectric sensors 12 disposed at the periphery of the dial 8. The LED 6 may be a 2 CU2 type, and the photoelectric sensors 12 may be a PH302 type.

Figure 6:
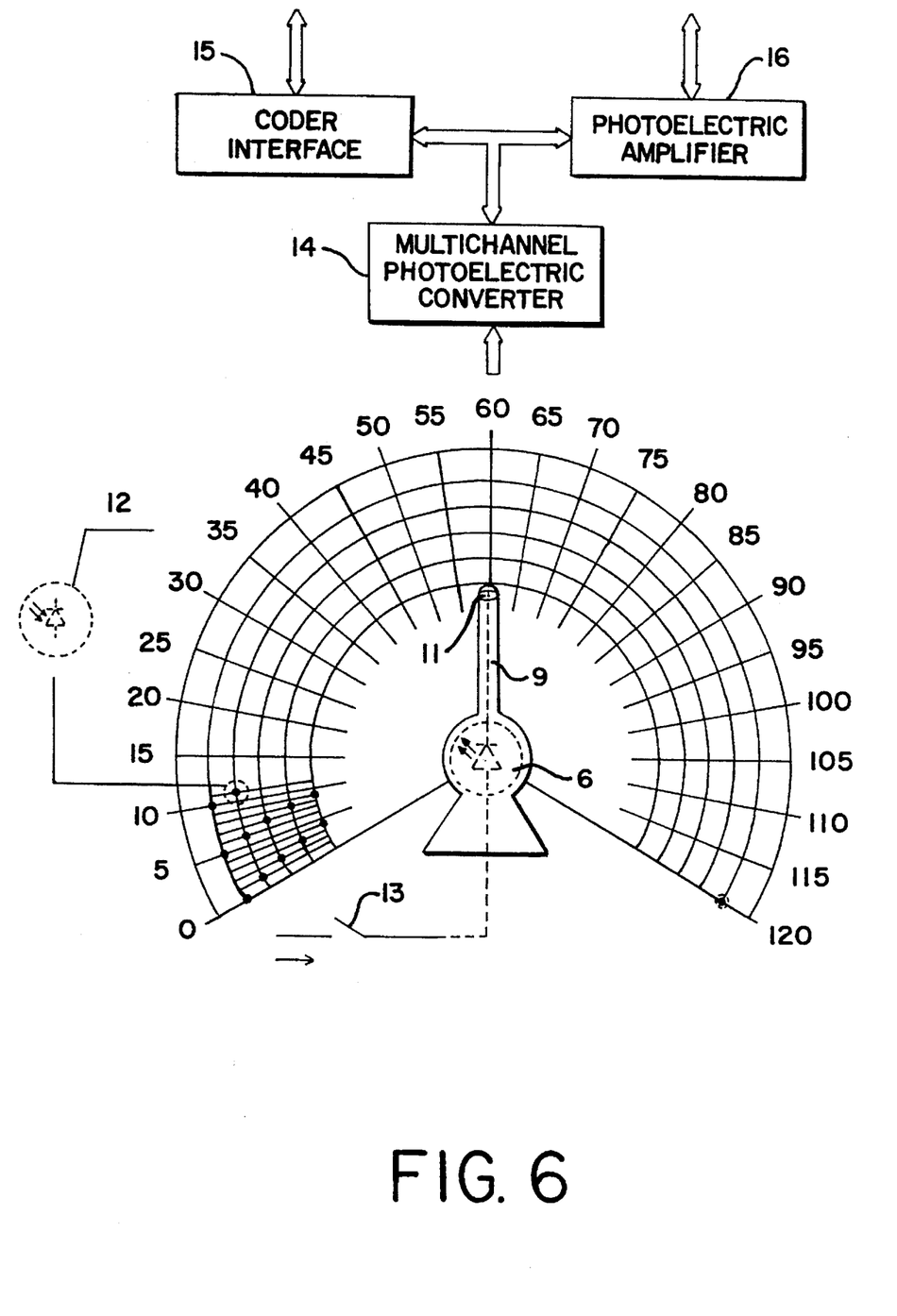
FIG. 6 is a schematic diagram showing the arrangement of the photoelectric sensors on the speed indicating dial.

Photoelectric sensors 12 can be disposed on the speed indicia marks of the dial 8 or disposed on a line that radiates from the center of the indicating needle shaft 5 to the speed indicia marks on the dial 8, as is illustrated in FIG. 6, or on an extension of that line. For example, they can be disposed on an inner surface of the housing 33 (see FIG. 1B) of the speedometer. The divergence of the light beam is controlled by the lens 11, so its width is less than the distance between two adjacent photoelectric sensors, thereby preventing the photoelectric sensors 12 from producing erroneous signals.

Figure 1B:
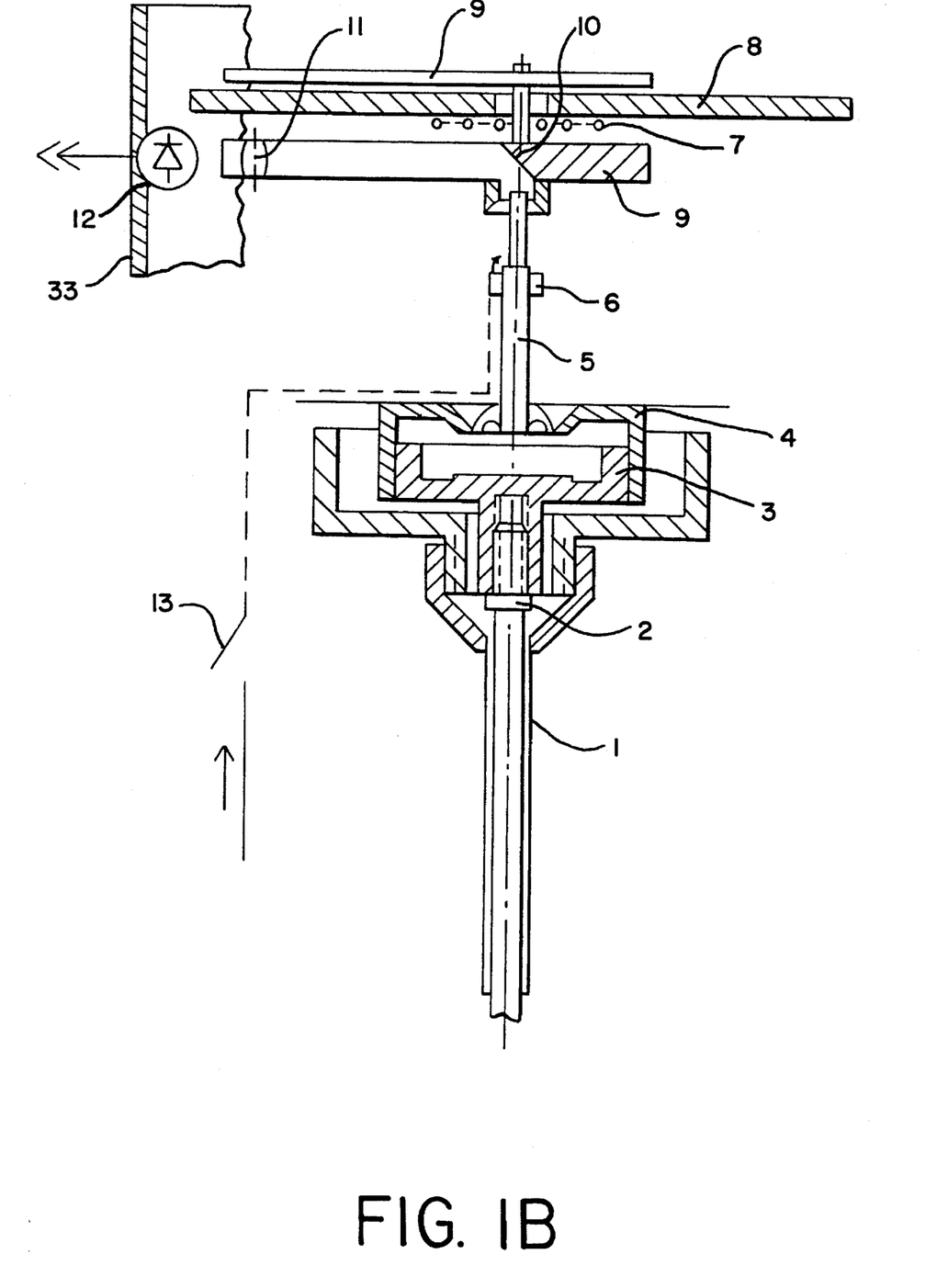
FIG. 1B is a schematic diagram showing another embodiment of the structure of the speedometer according to the present invention.

An alternative embodiment of the speed indicating needle of the present invention is shown in FIG. 1B. This embodiment includes a first needle 9' that is located on the upper surface of the dial 8 and a second needle 9 that is located under the speed indicating dial 8. The second indicating needle 9 has the same structure as the photoelectric speed indicating needle 9 shown in FIG. 1 differing only in that it is disposed under the speed indicating dial 8 in order to prevent interference from external light. The first indicating needle 9' has a structure that is the same as that found in an ordinary magnet-type speedometer and is disposed on the upper surface of the speed indicating dial 8. The movements of the two speed indicating needles 9, 9' are exactly coincident with each other, i.e. parallel, axially, and synchronously.

Photoelectric sensors 12 are also disposed under the speed indicating dial 8. According to the present invention and the principle of photoelectric conversion, the signal transmitted from any photoelectric sensor disposed on the speed indicating dial, which is produced by projecting a light beam emitted from the speed indicating needle, is the real-time speed signal of the present invention.

If the highest speed shown on the indicating dial 8 is 240 km/hr, then the indicating dial 8 according to the present invention could be marked at the points of 5, 10, 15, 20, . . . . . . . , 240 km/hr in accordance with the conventional mechanical speedometer, and 48 photoelectric sensors 12 would be disposed on the indicating dial 8. Thus the speed indicating needle 9 will be pointing to the 20th photoelectric sensor 12 when the speed of the car is 100 km/hr. Similarly, light emitted from the speed indicating needle 9 will be projected on certain photoelectric sensors according to the speed of the vehicle, and will provide an instant electric signal. Accordingly the speed of the vehicle can be known based on the position of the photoelectric sensor 12 on which the light is projecting. Alternatively, 240 photoelectric sensors 12 or the like could be disposed on the indicating dial 8, wherein the dial 8 would be marked at the points of 1, 2, 3, 4, . . . . . . . , 240 km/hr.

The LED 6 is connected to power through a control switch 13, which can be controlled by an operation signal from within the vehicle for setting the LED 6 to the ON state. The operation signal can be a brake signal or other operation signals, such as signals provided by turning a lever or by the electric horn. The operation signal could also be a remote signal from outside of the vehicle. When the driver steps on the brake pedal, the LED 6 is connected to the brake lamp, and is controlled by the break device.

Figure 2:
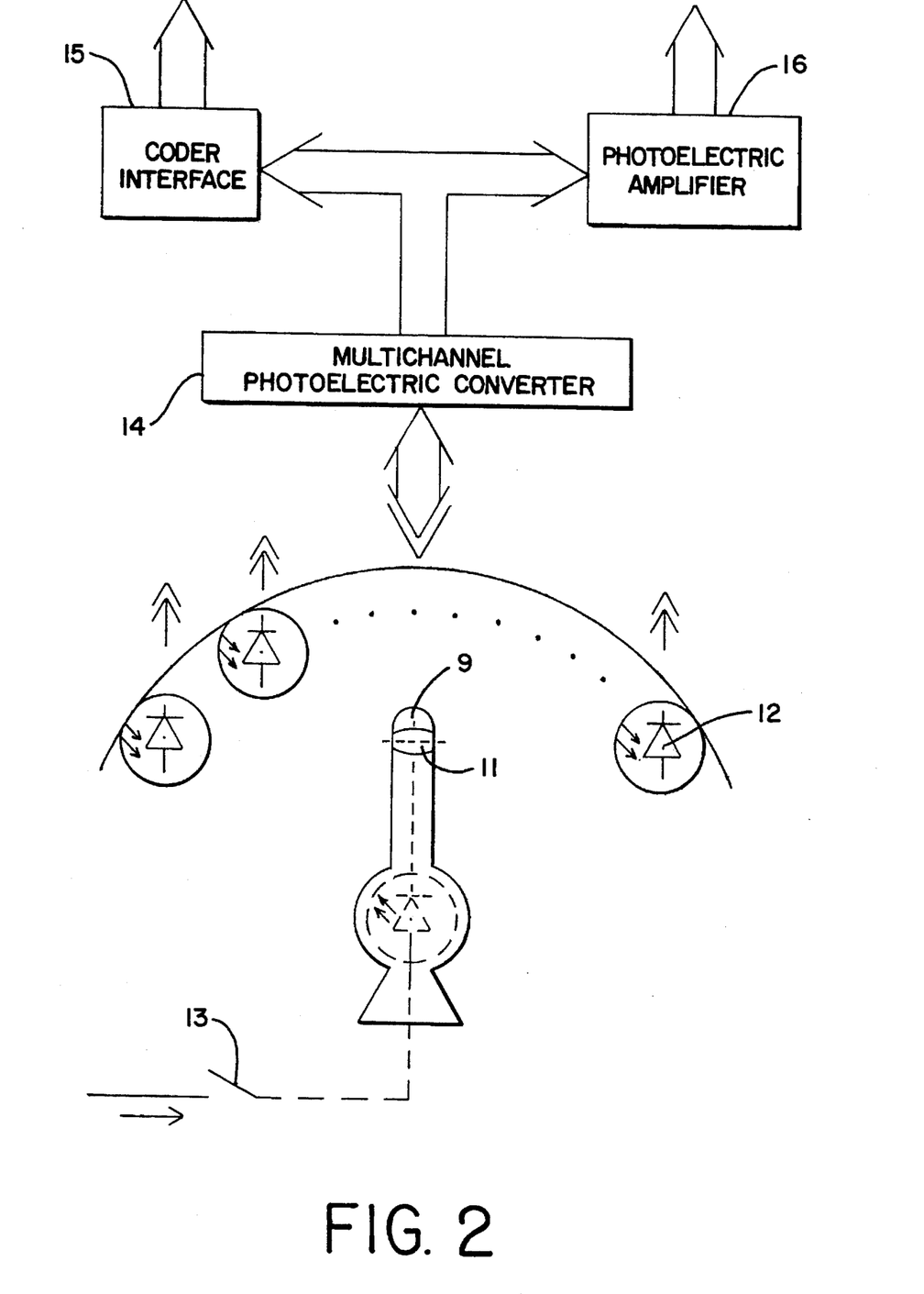
FIG. 2 shows the principle and structure of the present invention.

As shown in FIG. 2, there is a plurality of photoelectric sensors 12 which are connected to the respective channels of the multichannel photoelectric converter 14, the multichannel photoelectric converter 14 is connected to a coder through interface 15 and a photoelectric amplifier through interface 16, to form interfaces.

When the control switch 13 is turned on, the light emitted from the LED 6 via the converging lens 11 in the tip of the indicating needle 9 is projected onto a photoelectric sensor 12 at the position of a speed indicia mark, the voltage signal produced by the photoelectric sensor 12 will be processed in the coder through interface 15 for reshaping, grating and coding, and a real-time speed signal will be provided. The coder with its interface 15 can be combined with a speed recording and displaying means to record and display the instant speed, or can be combined with a speed control block to process voltage signal produced by the photoelectric sensor 12 by switching on a selective analogue switch in the photoelectric amplifier with its interface 16 using the speed discrimination code produced by the coder with its interface 15 as the signal, thus providing an electrical control signal provided from the photo-amplifier with its interface 16 for controlling the speed of the vehicle. The combination of means and their functions and the schematic diagram of circuits will be explained by examples shown in FIGS. 3 to 5.

Figure 3:
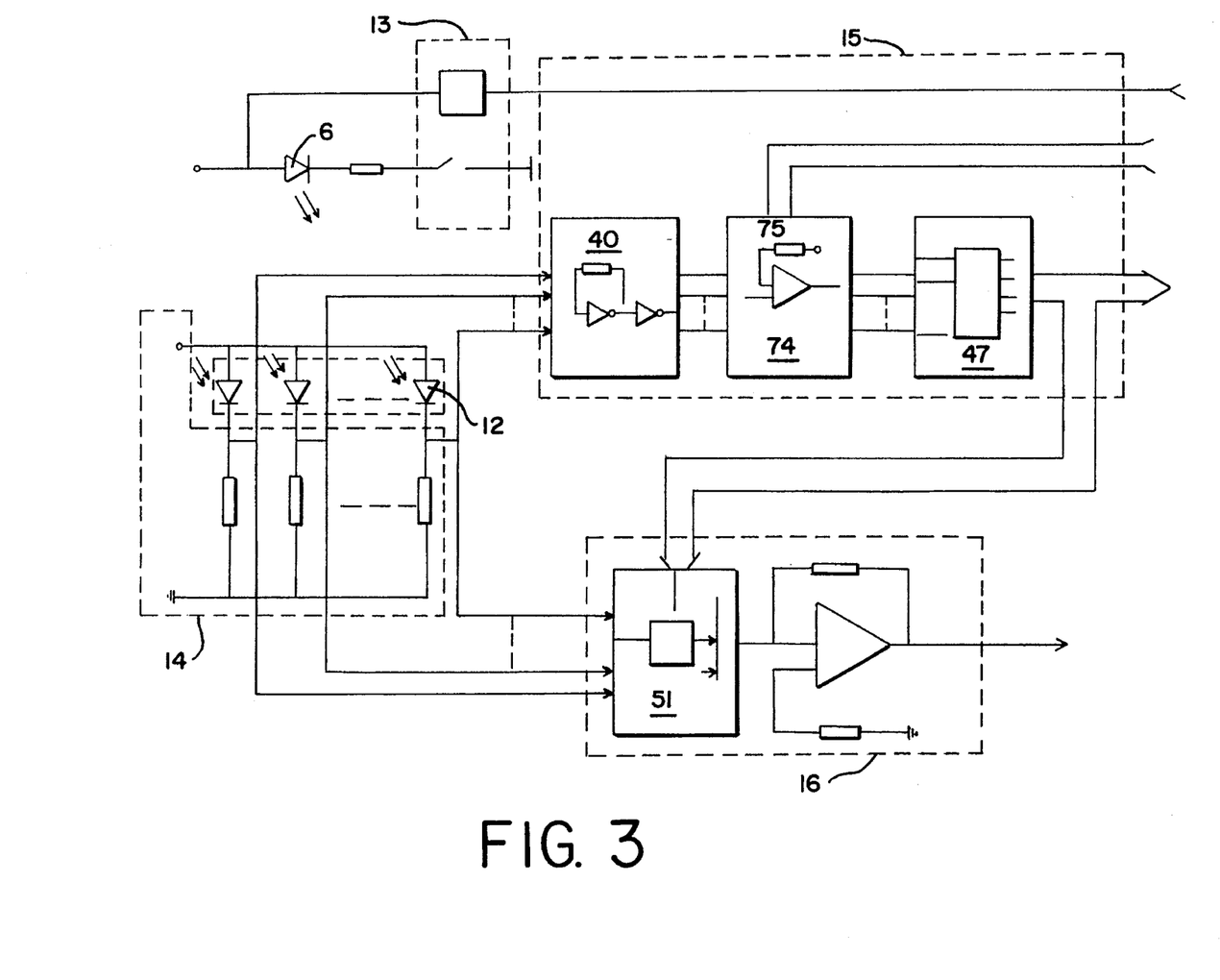
FIG. 3 is a schematic diagram of the circuit of the present invention.

In FIG. 3, the LED 6 disposed on the speed indicating needle shaft 5 is a 2CU2 type, and is similar to the LED 6 shown in FIGS. 1 and 2. Photoelectric sensors 12 disposed on the photoelectric indicating dial 8 are of the type PH302. According to the present invention, and as illustrated in FIG. 3, when light from the LED 6 is projected on the photoelectric sensor 12, the voltage signal produced by the photoelectric sensor 12 enters into the input of "AND" gate 74 after being reshaped in the "AND NOT" gate 40.

When another control terminal 75 of the "AND" gate 74 used for receiving the external control signal has no input signal or the "AND" gate 74 is gated, the signal, i.e. the reshaped standard logic level signal produced by the photoelectric sensors 12 projected by light form the photoelectric speed indicating needle 9 will enter the coder 47 and a code representing the speed of the vehicle will be outputed from its output terminal. In this case, the signal of photoelectric sensor 12 also enters into operational amplifier 41 from multichannel selective switch 51 shown in FIG. 3, and becomes an electrical control signal. The amplifier has a time delay circuit (not shown) for controlling the delay of the electrical signal, for the purpose of meeting the requirement of acoustic or visual alarm when the speed signal is equal or over the limited value.

Figure 4:
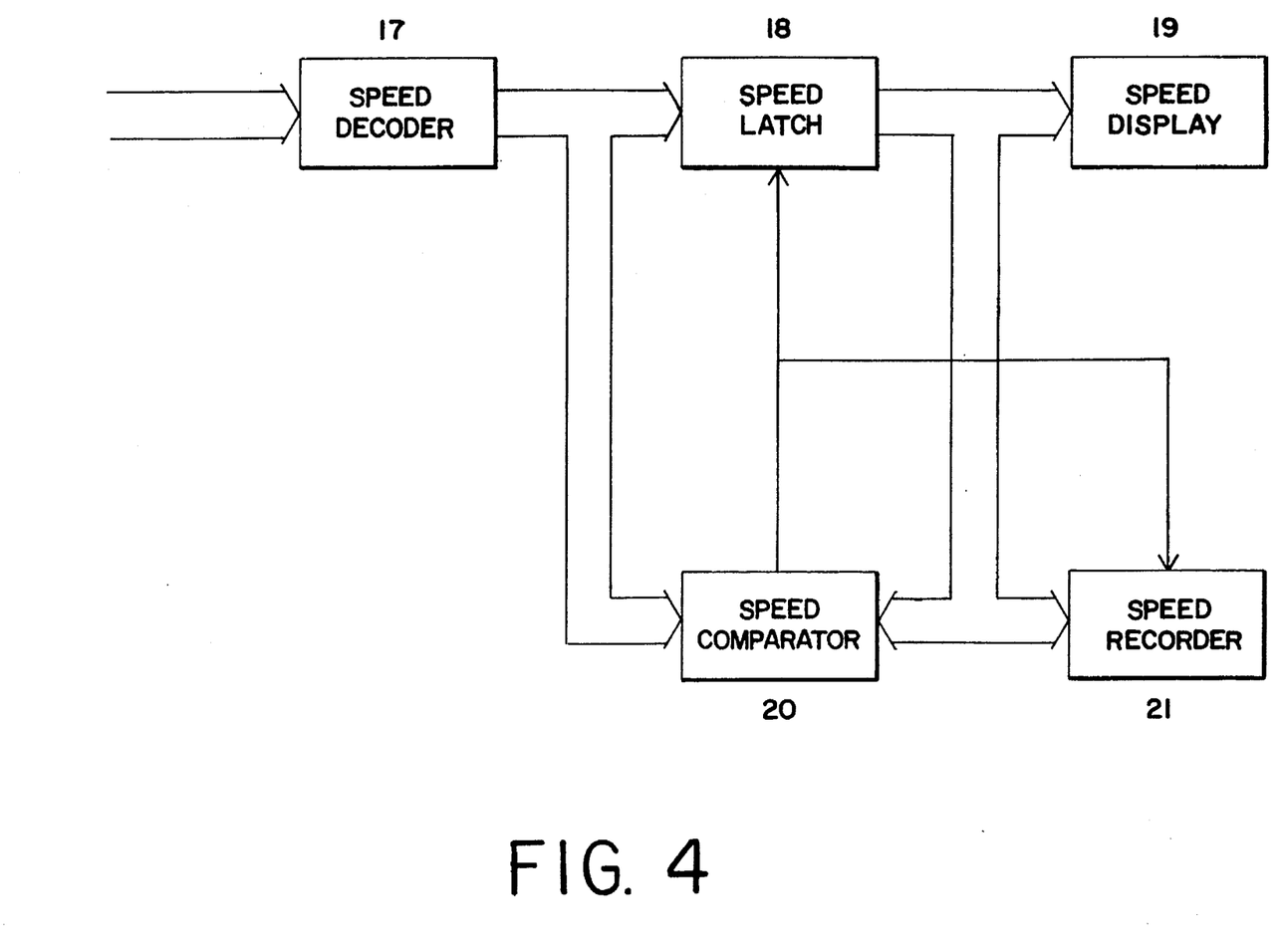
FIG. 4 is a block diagram including a speed monitoring, automatically recording and displaying block according to the present invention.

FIG. 4 is a block diagram showing a device for automatically recording and displaying the speed. The output signal from the coder with its interface 15 is transmitted to the automatic recording and displaying means.

In accordance with the principle of the present invention, when the driver steps on the brake pedal at any time when the vehicle is moving, the coding signal provided by the coder with its interface 15, i.e. the speed discrimination code provided by coder 47, shown in FIG. 3, is converted into an instant speed value representing the speed of the vehicle by the speed decoder 17 shown in FIG. 4. The present speed value at the time when the driver steps on the brake pedal will be compared with the former speed value stored in the speed latch 18 by a speed comparator 20. An update signal is provided by the speed comparator 20 when the present speed value is greater than the former speed value stored in the latch 18, and the new speed value will be displayed by the speed display 19; otherwise the former speed value will not be renewed. Meanwhile, a speed recorder 21 is actuated by the update signal produced by the speed comparator 20 to store the renewed speed value in a RAM or EEPROM to be helpful for the inspection by traffic administration authorities. The above mentioned display will-be unchanged until there appears another speed value which is higher than the previous one. Thus, when the driver steps on the brake, the stand-by output interfaces combine with different functional means to accomplish the automatic speed recording function.

Figure 5:
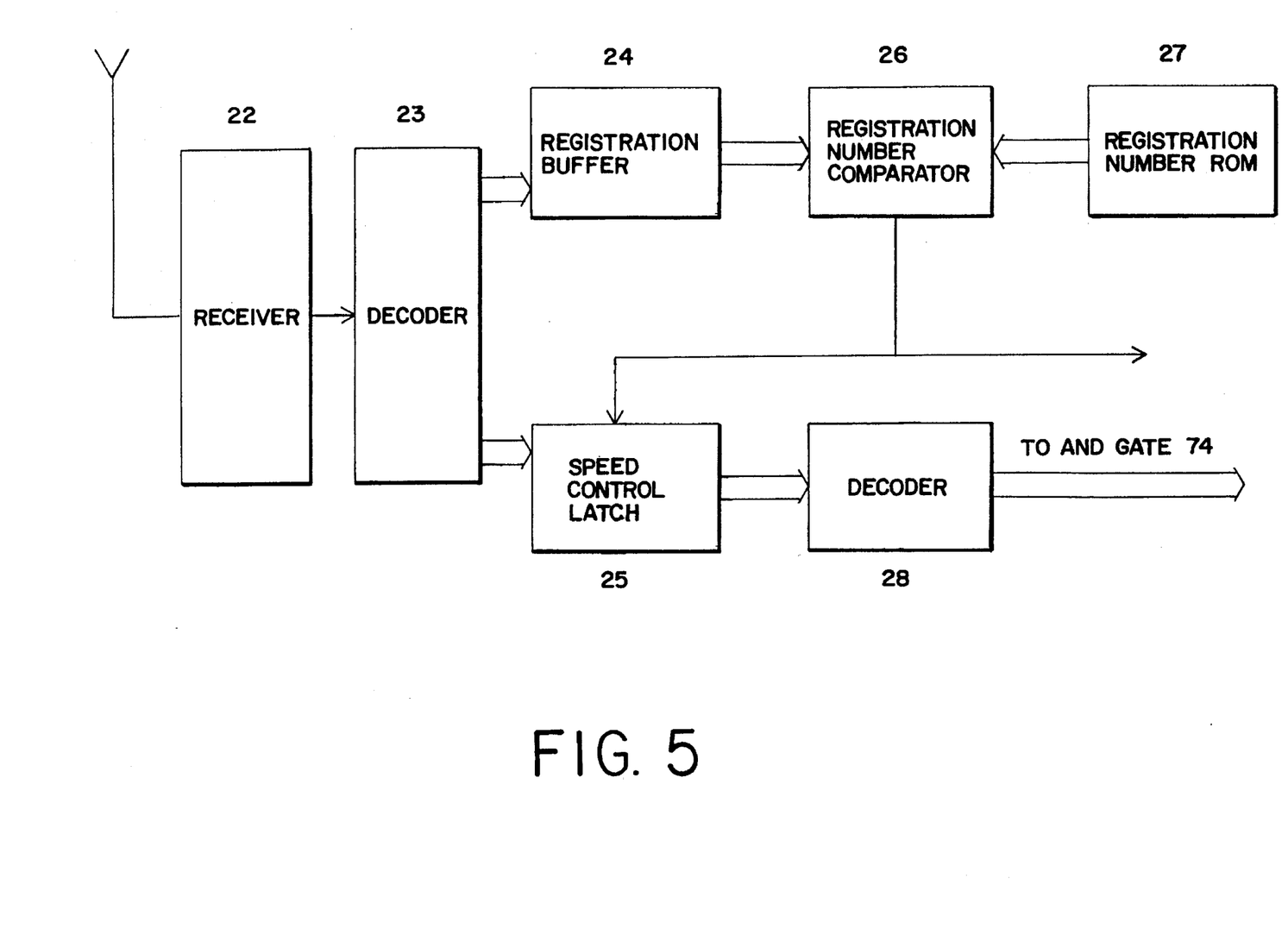
FIG. 5 is a block diagram showing a speed control block according to the present invention.

FIG. 5 is a block diagram showing a control block for controlling the speed of a vehicle, wherein the block receives a control signal from outside the vehicle and processed speed control signal to the control terminal 75 of the "AND" gate circuit 74 shown in FIG. 3.

It should be noted that the speed control value and the registration number of the vehicle can be provided by an outside remote control signal, and the registration number is stored in a ROM thereby the owner of the vehicle would not be able to change it. The speed control value and the registration number, after being inputted from the keyboard of the controller, is coded and then transmitted by radio wave (the signal emitting unit is not shown in FIG. 5).

In FIG. 5, after the receiver 22 receives a control signal from outside the vehicle, the registration number and speed control value are decoded by the decoder 23 and will be sorted in a registration buffer 24 and a speed control value latch 25, when the inputted registration number is the same as the registration number stored in the registration number ROM 27, a confirm signal is produced by the registration number comparator 26 and enables the terminal OE of the speed control latch 25, thus switching on the control switch 12 shown in FIG. 3, thereby the LED 6 can provide a light signal. Meanwhile, the speed control signal is fed into the decoder 28. When the registration number is confirmed by the registration comparator 26, the speed control signal from the decoder 28, i.e. the emitted speed control signal from outside of the vehicle received by the receiver 22, is inputted to the control terminal 75 of the "AND" gate circuit 74 in FIG. 3. The "AND" gate circuit 74 has an input terminal connected to an output terminal of an "AND-NOT" gate circuit 40 and another input terminal as a control input terminal 75. When a control input signal with high level enters into the terminal 75 of the "AND" gate 74, the "AND" gate 74 is open, and an output signal is produced from the "AND" gate 74 in response to an input signal from the "AND-NOT" gate 40. While a control input signal with low level enters into the terminal 75, and "AND" gate 74 is cut-off, at that time either the signal from the "AND-NOT" gate 40 is with high level or low level, the output signal produced from the "AND" gate 47 keeps with low level. Therefore, when a low level signal representing low speed limit and a high level signal representing high speed limit enter into the control terminal 75 of the "AND" gate 74, the respective "AND" gate relating to the low speed limit is cut-off while the respective "AND" gate 74 relating to the high speed limit is kept open. In this case, the speed limit high level signal from outside the vehicle will open the multichannel analogue switch 51 through the output terminal of the coder 47 according to the coded address, and the voltage signal from another terminal of the photoelectric sensor 12 is amplified, and provides an electric control signal from the amplifier 41 after a time-delay. The electric control signal will be used in relative speed control units, for example, the ignitor, control system for fuel supply, or automatic speed operation device, to stop or slow down the vehicle. Otherwise, the speed limit low level signal from the outside will be cut-off, the light beam, emitted by the LED 6, reflected by the 45 degree mirror 10, converged by the converging lens 11, and deflected along with the photoelectric speed indicating needle 9 according to the speed of the vehicle, will be projected onto the photoelectric sensors 12, while the output voltage signal will not be able to enter the coder 47 to open the multichannel analogue switch, so there is no electric control signal produced from the output terminal of the amplifier 41 thereby the controlled vehicle can be run under the normal speed. Thus the speed of the vehicle can be controlled, so it is easy for traffic administration to inspect and control. Furthermore, interfaces of the present invention can be optionally combined with different functional means, such as speed limitation controlling means or other speed controlling means used in vehicle speed recording type speedometers, to achieve the auto-speed control function which is a further application of the present invention.

The photoelectric elements 12 and switches disclosed herein are not limited by the type disclosed herein, and can use other types which have the same functions.

The new speedometer according to the present invention which can provide real-time speed signals, can also be used for other kinds of vehicles which have conventional mechanical speedometers.

The speedometer according to the present invention can also be used as an additional unit to add on various motor vehicles.

What is claimed is:

1. A speedometer providing real-time speed signals, comprising a magnet-type speed transmitting portion, a speed indicating portion, a photoelectric monitoring portion and a speed signal conversion portion;

said speed transmitting portion having a driving flexible shaft connected to a driving shaft, the driving shaft being fitted with a permanent magnet magnetically-coupled with an iron cup, the iron cup being fitted with a speed indicating needle shaft;

said speed indicating portion having a photoelectric speed indicating needle connected to said speed indicating needle shaft, a speed indicating dial being positioned under the photoelectric speed indicating needle;

said photoelectric monitoring portion comprising:

a LED disposed on the speed indicating needle shaft, the light emitted from the LED travels through the photoelectric speed indicating needle, and transmitted out from the photoelectric speed indicating needle;

a plurality of photoelectric sensors positioned on the periphery of the indicating dial at locations corresponding to the speed marks, said plurality of photoelectric sensors functioning to receive the light from the speed indicating needle and provide electric signals;

said speed signal conversion portion comprising:

a multichannel photoelectric converter connected to said photoelectric sensors at their terminals;

a coder including an interface, and a photoelectric amplifier including an interface, connected to the outputs of said multichannel photoelectric converter, respectively, to form sets of interfaces for providing real-time speed signals.

2. A speedometer according to the claim 1, wherein said speed indicating portion further includes: a control switch connected to said LED for controlling the ON and OFF state of the LED in accordance with internal Signals from within the vehicle and external remote control signals from outside the vehicle.

3. A speedometer according to the claim 1, wherein said speed indicating portion further includes: a 45 degree mirror being disposed within the photoelectric speed indicating needle and facing the incident direction of the light emitted from the LED for reflecting the light to the tip of the photoelectric speed indicating needle, and a converging lens is disposed at the end of the photoelectric speed indicating needle to project the light onto the receiving surface of an aligned photoelectric sensor.

4. A speedometer according to claim 1, wherein said photoelectric sensors are disposed at the speed marks on the speed indicating dial.

5. A speedometer according to claim 1, wherein said coder with its interface is connected to a speed recording and displaying device to record and display the speed of the vehicle automatically.

6. A speedometer according to claim 1, wherein said indicating portion further includes a signal receiver for receiving a remote control signal, the signal received thereby is fed into the coder with its interface for controlling the ON and OFF of the light emitted from the LED, thereby an electric control signal is provided from the output of the photoelectric amplifier according to said remote control signal, and the electric control signal is used to control the ignitor, fuel pumps and conduit valves, and to alter the speed of the vehicle.

7. A speedometer according to claim 1, wherein said plurality of photoelectric sensors are disposed on the speed indicating dial at positions of the speed marks, lines between the center of the indicating needle shaft and the speed marks, and on extension of said lines beyond said speed marks.

8. A speedometer according to claim 1, wherein said indicating portion further includes a signal receiver for receiving a remote control signal, the signal received thereby is fed into the coder with its interface for controlling the production of the photoelectric signal, thereby an electric control signal is provided from the output of the photoelectric amplifier with its interface according to said remote control signal, and the electric control signal is used to control the ignitor, fuel pumps and conduit valves, and to alter the speed of the vehicle.

9. A speedometer providing real-time speed signals, comprising a magnet-type speed transmitting portion, a speed indicating portion, a photoelectric monitoring portion and a speed signal conversion portion;

said speed transmitting portion having a driving flexible shaft connected to a driving shaft, the driving shaft being fitted with a permanent magnet magnetically-coupled with an iron cup, and said iron cup being fitted with a speed indicating needle shaft;

said photoelectric monitoring portion comprising:

a first speed indicating needle functioned as a photoelectric speed indicating needle having a 45 degree mirror and a converging lens, and being positioned under the speed indicating dial;

a LED disposed at the speed indicating needle shaft, the light emitted from the LED travels through the first speed indicating needle, and transmitted out from the first indicating needle;

a plurality of photoelectric sensors positioned at the periphery of the indicating dial at locations corresponding to the speed marks, and under the dial, said plurality of photoelectric sensors functioning to receive the light emitted from the first speed indicating needle and provide electric signals;

said speed indicating portion having a second speed indicating needle connected to said speed indicating needle shaft, and being positioned on the speed indicating dial in coaxial, parallel and moving in synchronism with the first speed indicating needle;

said speed signal conversion portion comprising:

a multichannel photoelectric converter being connected to said photoelectric sensors at their terminals;

a coder including an interface and a photoelectric amplifier including an interface, connected to the outputs of said multichannel photoelectric converter, respectively, to form sets of interfaces for providing real-time speed signals.

10. A speedometer according to the claim 9, wherein said speed indicating portion further includes:

a control switch connected to the LED for controlling the ON and OFF states of the LED in accordance with the internal signal of a vehicle and external remote control signals outside the vehicle.

11. A speedometer according to claim 9, wherein said indicating portion further includes a signal receiver for receiving a remote control signal, the signal received thereby is fed into the coder with its interface for controlling the ON and OFF states of the light emitted from the LED, thereby an electric control signal is provided from the output of the photoelectric amplifier with its interface according to said remote control signal, and the electric control signal is used to control the ignitor, fuel pumps and conduit valves, and to alter the speed of the vehicle.

12. A speedometer according to claim 9, wherein said coder is connected to a speed recording and displaying device to record and display the speed of the vehicle automatically.

13. A speedometer according to claim 9, wherein said plurality of photoelectric sensors are disposed on the speed indicating dial at positions of the speed marks, lines between the center of the indicating needle shaft and the speed marks, and on extension of said lines beyond said speed marks.

14. A speedometer according to claim 9, wherein said indicating portion further includes a signal receiver for receiving a remote control signal, the signal received thereby is fed into the coder with its interface for controlling the production of the photoelectric signal, thereby an electric control signal is provided from the output of the photoelectric amplifier with its interface according to said remote control signal, and the electric control signal is used to control the ignitor, fuel pumps and conduit valves, and to alter the speed of the vehicle.

* * * * *